(12) United States Patent
Allora et al.

(10) Patent No.: US 10,343,584 B2
(45) Date of Patent: *Jul. 9, 2019

(54) BULK COOKING OIL DISTRIBUTION SYSTEM

(71) Applicants: Michael Allora, New Vernon, NJ (US); Ronald B. Dana, Avenel, NJ (US); Michael Allora, Jr., New Vernon, NJ (US)

(72) Inventors: Michael Allora, New Vernon, NJ (US); Ronald B. Dana, Avenel, NJ (US); Michael Allora, Jr., New Vernon, NJ (US)

(73) Assignee: Oilmatic Systems LLC, Keasbey, NJ (US)

( * ) Notice: Subject to any disclaimer, the term of this patent is extended or adjusted under 35 U.S.C. 154(b) by 199 days.

This patent is subject to a terminal disclaimer.

(21) Appl. No.: 15/212,550

(22) Filed: Jul. 18, 2016

(65) Prior Publication Data

US 2016/0325670 A1    Nov. 10, 2016

Related U.S. Application Data

(63) Continuation of application No. 13/461,442, filed on May 1, 2012, now Pat. No. 9,392,907.

(51) Int. Cl.
*B60P 3/22* (2006.01)
*A47J 37/12* (2006.01)
*B67D 7/04* (2010.01)

(52) U.S. Cl.
CPC ........... *B60P 3/225* (2013.01); *A47J 37/1271* (2013.01); *A47J 37/1285* (2013.01); *B67D 7/04* (2013.01); *Y10T 137/85978* (2015.04)

(58) Field of Classification Search
CPC ........ B60P 3/225; B67D 7/04; A47J 37/1285; A47J 37/1271; Y10T 137/85978
USPC ...... 141/1-2, 9, 98, 231, 234, 247, 285, 392
See application file for complete search history.

(56) References Cited

U.S. PATENT DOCUMENTS 3,674,166 A * 7/1972 Dunbar ..................... B60P 1/16
  298/17.5
4,360,046 A * 11/1982 Streit ....................... C11B 13/00
  141/231
4,485,831 A * 12/1984 Ungerleider ........ A47J 37/1271
  137/1
4,622,135 A * 11/1986 Williams ............ A47J 37/1223
  137/335

(Continued)

*Primary Examiner* — Nicolas A Arnett
(74) *Attorney, Agent, or Firm* — Charney IP Law LLC

(57) ABSTRACT

A portable cooking oil distribution device for filling remote fryers with fresh cooking oil. In other embodiments the device can also collect used cooking oil from the fryer. In one embodiment, a portable device includes a fresh oil tank, a three-way valve connected by piping to the fresh oil tank, a pump connected by piping to the three-way valve, and a nozzle connected by piping to the pump, the nozzle having an outlet tube connected to the piping between the pump and the nozzle. The device may also include a used oil tank, a second three-way valve connected by piping to the used oil tank, a second pump connected by piping to the three-way valve, and piping connecting the second pump to the nozzle, where the nozzle includes a inlet tube connected to the piping between the pump and the nozzle.

16 Claims, 6 Drawing Sheets

(56) References Cited

U.S. PATENT DOCUMENTS

| | | | | |
|---|---|---|---|---|
| RE33,945 E * | 6/1992 | Beaty | | E03F 7/106 137/355.12 |
| 5,247,876 A * | 9/1993 | Wilson | | A47J 37/1223 99/408 |
| 5,340,471 A * | 8/1994 | Wilson | | A47J 37/1223 210/167.28 |
| 5,597,601 A * | 1/1997 | Griffin | | A47J 37/1223 210/167.28 |
| 5,609,193 A * | 3/1997 | Steckler | | A47J 37/1271 137/341 |
| 5,717,817 A * | 2/1998 | Brooks | | B67D 7/80 392/339 |
| 5,823,097 A * | 10/1998 | Dirck | | A47J 37/1271 99/408 |
| 5,832,810 A * | 11/1998 | Brawley, Sr. | | A47J 37/1271 99/408 |
| 5,839,360 A * | 11/1998 | Williams | | A47J 37/1223 99/408 |
| 5,895,104 A * | 4/1999 | Grandi | | A47J 39/006 312/268 |
| 5,908,551 A * | 6/1999 | Onken | | A47J 37/1271 210/184 |
| 5,964,258 A * | 10/1999 | Schoenbauer | | A47J 37/1223 141/231 |
| 6,227,405 B1 * | 5/2001 | Andreoli | | A47J 37/1271 220/210 |
| 6,306,294 B1 * | 10/2001 | Blair | | A47J 37/1271 210/167.28 |
| 6,330,852 B1 * | 12/2001 | Williams | | A47J 37/1223 210/167.28 |
| 6,612,591 B1 * | 9/2003 | Watanabe | | B60P 3/225 280/4 |
| 6,792,983 B2 * | 9/2004 | Allora | | A47J 37/1223 141/18 |
| 6,971,410 B2 * | 12/2005 | Sari | | B62B 3/104 137/565.01 |
| 7,938,959 B1 * | 5/2011 | Inman | | A47J 37/1233 137/206 |
| 8,561,462 B2 * | 10/2013 | Arnold | | G01F 23/0053 73/301 |
| 8,831,413 B2 * | 9/2014 | Arnold | | G01F 23/0053 392/441 |
| 8,926,837 B1 * | 1/2015 | Shumate | | A47J 37/1276 210/167.28 |
| 9,156,390 B2 * | 10/2015 | Allora | | A47J 37/1271 |
| 9,392,907 B2 * | 7/2016 | Allora | | A47J 37/1271 |
| 9,776,115 B1 * | 10/2017 | Dattilo | | A47J 37/1271 |
| 9,861,234 B2 * | 1/2018 | Forrest | | A47J 37/1219 |
| 2002/0046657 A1 * | 4/2002 | Takahashi | | A47J 37/1223 99/330 |
| 2002/0048503 A1 * | 4/2002 | Fukushima | | B65G 1/0407 414/266 |
| 2003/0192621 A1 * | 10/2003 | Allora | | A47J 37/1223 141/98 |
| 2008/0196596 A1 * | 8/2008 | Forrest | | A47J 37/1219 99/408 |
| 2008/0277412 A1 * | 11/2008 | Palazzo | | A47J 37/1223 222/63 |
| 2010/0312601 A1 * | 12/2010 | Lin | | G06Q 10/0637 705/7.36 |
| 2011/0168282 A1 * | 7/2011 | Mitropoulos | | A47J 37/1271 137/565.01 |
| 2011/0176792 A1 * | 7/2011 | Arnold | | G01F 23/0053 392/449 |
| 2011/0284472 A1 * | 11/2011 | Pahl | | B01D 17/0205 210/708 |
| 2013/0291969 A1 * | 11/2013 | Allora | | A47J 37/1271 137/565.01 |
| 2013/0291997 A1 * | 11/2013 | Allora | | A47J 37/1271 141/1 |
| 2014/0199453 A1 * | 7/2014 | Deweese | | C11B 13/00 426/495 |

* cited by examiner

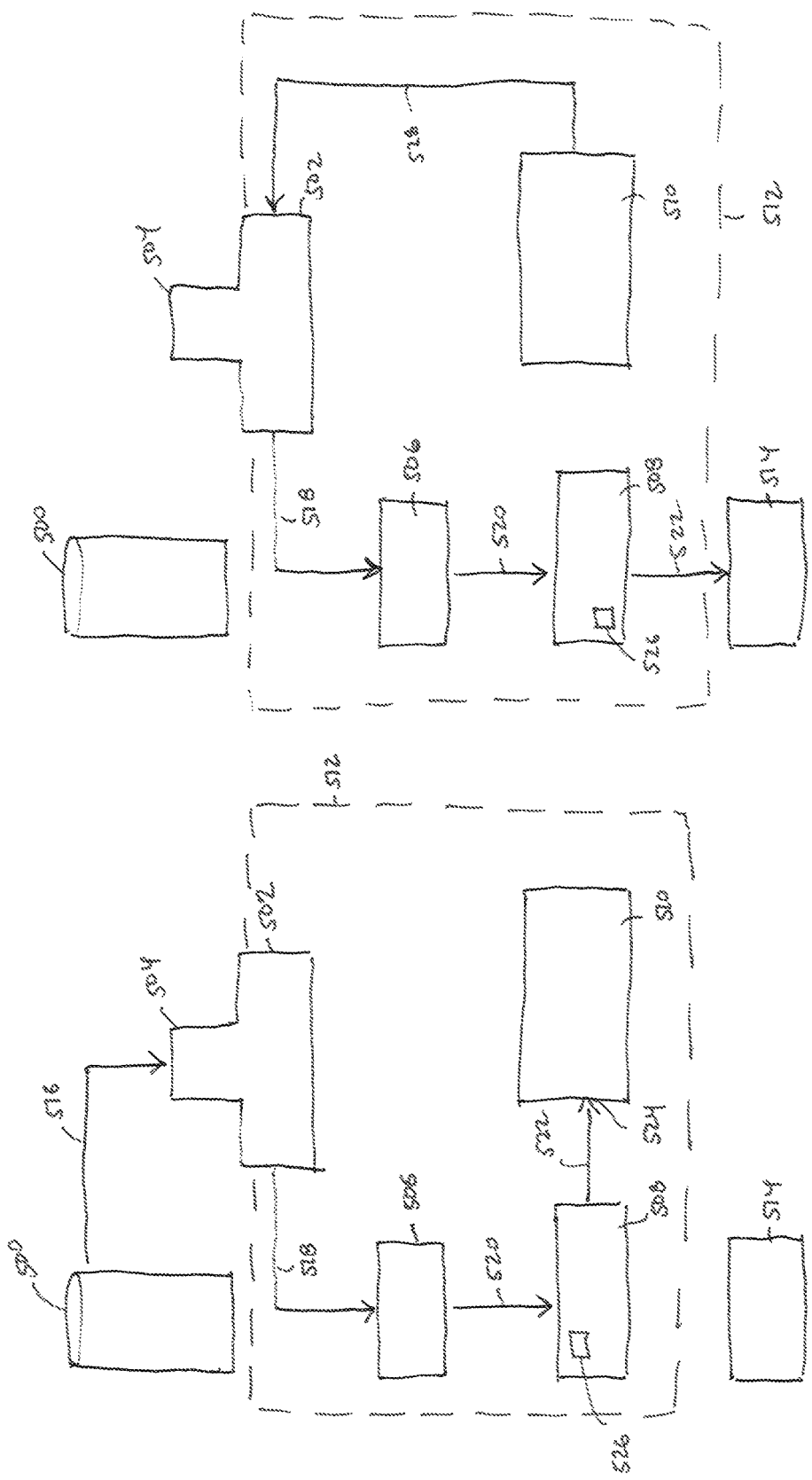

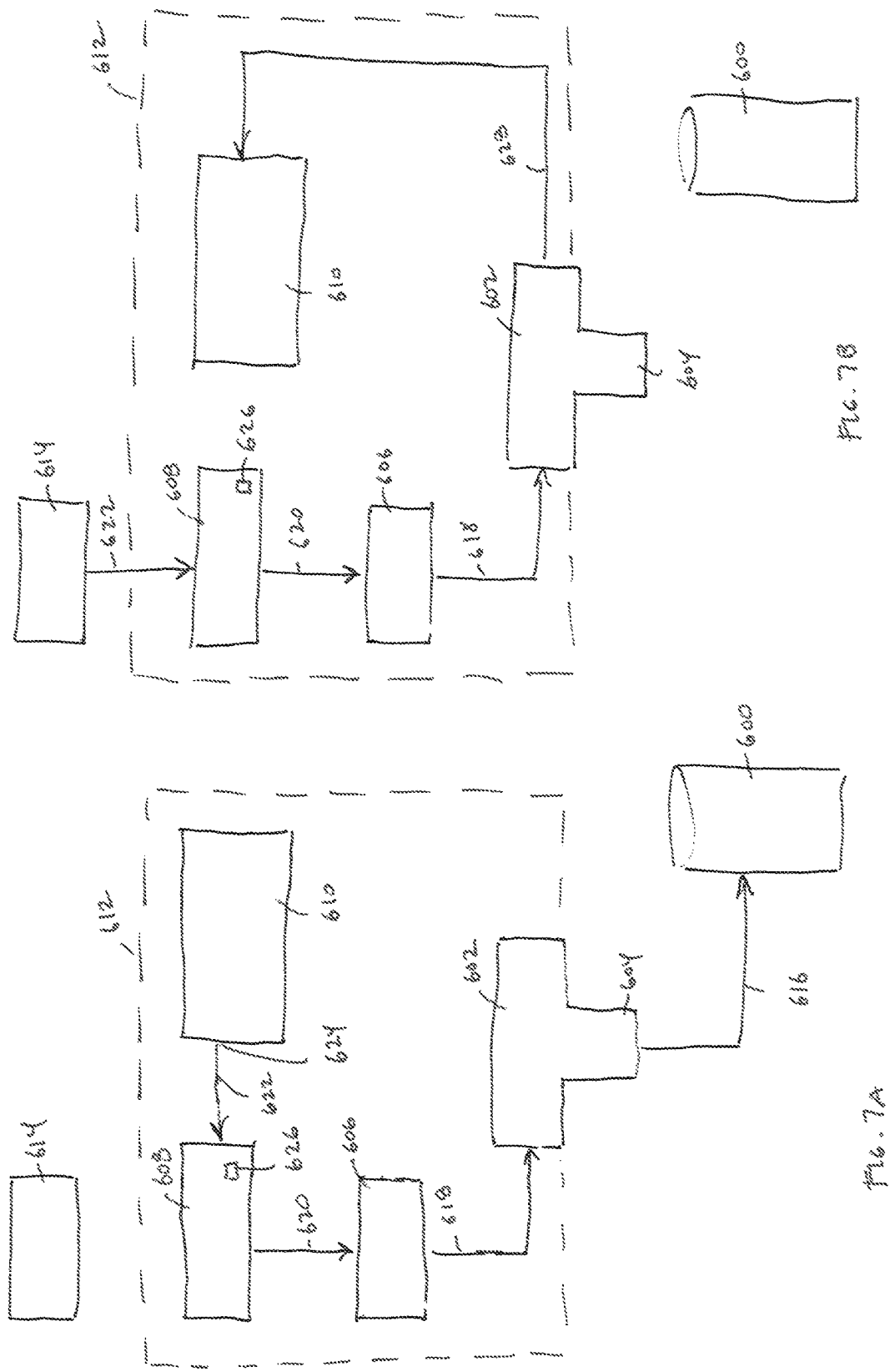

BULK COOKING OIL DISTRIBUTION SYSTEM

CROSS-REFERENCE TO RELATED APPLICATIONS

The present application claims benefit of U.S. patent application Ser. No. 13/461,442 filed May 1, 2012, expected to issue on Jul. 19, 2016 as U.S. Pat. No. 9,392,907, the disclosure of which is incorporated by reference herein.

BACKGROUND OF THE INVENTION

The present invention relates to systems and methods for distributing cooking oil for use in the food services industry. As will be understood, distribution may also include collection of used cooking oil.

Throughout the world, a tremendous amount of cooking oil is used in the food, services industry, primarily for deep frying foodstuffs. Traditionally, cooking oil was delivered to food preparation facilities in five-gallon containers. These heavy and somewhat awkward containers were stored in the facility and then carried by hand to deep fryers for filling with oil as necessary. This task was labor intensive and resulted in unnecessary waste packaging. It also resulted in a large amount of waste oil as residual oil often remained, in the packaging after filling of the fryer despite the best efforts of the cooking staff.

Once the oil had gone through its useful life and was converted to used oil, the used oil was then spilled from the fryer into a five-gallon bucket for disposal in a remote dumpster, often located in an outdoor area of the cooking facility. Again, this was a labor intensive process that had many disadvantages. For one, the oil was typically removed from the fryer at the end of the business day and often was not permitted to sufficiently cool before an employee handled the oil, so transporting the hot oil by a tired employee often resulted in injury from burns. Additionally, general spills created an unsafe working area and slip and fails became problematic. Another detriment was that the remote dumpster became a haven for rodents and other unwanted pests. Finally, as used oil became more valuable, theft of the used oil from the storage location became a large issue.

Certain cooking oil distribution companies began using automated systems to alleviate the issues associated with the conventional method of supply and recovery. One such company is Climatic, LLC, which uses systems generally described in its U.S. Pat. No. 6,792,983, the disclosure of which is hereby incorporated by reference herein. In its popular commercial system, a fresh oil tank and used oil tank are provided in food preparation facility. Typically the tanks are provided indoors f or security reasons. The tanks are piped independently through separate pumps to a hand held distribution nozzle. One portion of the distribution nozzle is used to supply cooking oil to a fryer while a second portion is used to collect used cooking oil from the fryer. Operation is completely intuitive and no lifting of heavy oil is required.

In order to refill the fresh oil tank and remove used oil from the used oil tank, additional piping is provided. This piping typically terminates in a junction box located on an exterior wall of the cooking facility. A service truck may then attach piping to the junction box to fill the fresh tank and remove used oil from the used oil tank.

BRIEF SUMMARY OF THE INVENTION

Although well received in the food services industry, one issue that has been discovered with respect to these systems is that some facilities, particularly those that are not strictly restaurants, have kitchens that are remote from, external walls, have kitchens on a building level other than the first floor, or have several fryers that are remote from each other. While possible to provide piping to accommodate such a facility, it is often impractical from an aesthetics and/or cost standpoint.

It would therefore be beneficial to provide a bulk cooking oil distribution system that may adequately service such facilities.

The bulk cooking oil distribution systems and methods of the present invention are designed to overcome the deficiencies of conventional bulk cooking oil distribution systems, and are summarized generally below. Note that while various methods may foe provided with steps in particular orders, those orders are not to be considered the only order in which the various methods may be conducted.

In one embodiment, a bulk cooking oil distribution method comprises receiving fresh cooking oil in a first fresh cooking oil tank; transferring at least a portion of the fresh cooking oil from the first fresh cooking oil tank to a second fresh cooking oil tank, the second fresh cooking oil tank being associated with a vehicle; transferring at least portion of the fresh cooking oil from the second fresh cooking oil tank to a third fresh cooking oil tank located at a facility; transferring at least a portion of the fresh cooking oil from the third fresh cooking oil tank to a fourth fresh cooking oil tank, the fourth fresh cooking oil tank being associated with a first portable device; collecting used cooking oil in a first used cooking oil tank associated with a second portable device; transferring at least a portion of the used cooking oil from the first used cooking oil tank to a second used cooking oil tank located at the facility; transferring at least a portion of the used cooking oil from the second used cooking oil tank to a third used cooking oil tank, the third used cooking oil tank being associated with a vehicle; and transforming an least a portion of the used cooking oil from the third used cooking oil tank to a fourth used cooking oil tank.

The first fresh oil tank and the fourth used cooking oil tank may be located at a single depot.

The second fresh cooking oil tank and the third used cooking oil tank may be located on the same vehicle, The first portable device and the second portable device may be the same portable device. If so, the portable device may comprise two pumps. Also where the portable device and the second portable device are the same portable devices, the portable device may comprises a propulsion mechanism. The propulsion mechanism may be powered by one of electric, propane, or gasoline. Typically, the propulsion method will power wheels of the portable device.

The bulk cooking oil distribution method may further comprise transferring at least a portion of the fresh cooking oil from the fourth fresh cooking oil tank to a fryer in a kitchen of the facility. If so, the cooking oil distribution method may still further comprise transferring at least a portion of the fresh cooking oil from the fourth fresh cooking oil tank to a second fryer located in a second kitchen of the facility.

In the instance where the bulk cooking oil distribution method further comprises transferring at least a portion of the fresh cooking oil from the fourth fresh cooking oil tank to a fryer in a kitchen of the facility, the method may further comprise transferring at least a portion of the used cooking oil from the fryer in the facility to the first used cooking oil tank. This method may further comprise transferring at least a portion of the used cooking oil from a second fryer located in a second kitchen in the facility to the first used cooking oil tank.

In the various embodiments of the invention, the facility may be one of a stadium, arena, cruise ship, casino, shopping mall, convention hall, or multi-story building. While possible to provide piping to accommodate such a facility, it is often impractical from an aesthetics and/or cost standpoint.

In the bulk cooking oil distribution method, the facility may further comprise a kitchen at least partially enclosed by walls, wherein none of the walls is an exterior wall.

In the bulk cooking oil distribution method, the facility may further comprise a plurality of kitchens separated by walls, each kitchen having at least one fryer.

In the bulk cooking oil distribution method, the second fresh cooking oil tank may be integrated into the vehicle. In such case, the third used cooking oil tank may be integrated into the same vehicle.

In accordance with a further embodiment of the present invention, a cooking oil distribution method comprises the steps of receiving fresh cooking oil in a first fresh cooking oil tank; transferring at least a portion of the fresh cooking oil from the first fresh cooking oil tank to a second fresh cooking oil tank, the second fresh cooking oil tank being associated with a vehicle; transferring at least portion of the fresh cooking oil from the second fresh cooking oil tank to a third fresh cooking oil tank located at a facility; providing instruction to transfer at least a portion of the fresh cooking oil from the third fresh cooking oil tank to a fourth fresh cooking oil tank, the fourth fresh cooking oil tank being associated with a first portable device; providing instruction to collect used cooking oil in a first used cooking oil tank associated with a second portable device; providing instruction to transfer at least a portion of the used cooking oil from the first used cooking oil tank to a second used cooking oil tank located at the facility; transferring at least a portion of the used cooking oil from the second used cooking oil tank to a third used cooking oil tank, the third used cooking oil tank being associated with a vehicle; and transferring at least a portion of the used cooking oil from the third used cooking oil tank to a fourth used cooking oil tank.

In the cooking oil distribution method, the first and second portable devices may be the same device.

In the cooking oil distribution method, the second fresh cooking oil tank and the third used cooking oil tanks may be integrated into the same vehicle.

In a still further embodiment of the present invention, a cooking oil distribution method comprises transferring at least a portion of fresh cooking oil from a fresh cooking oil tank to a second fresh cooking oil tank associated with a first portable device; transferring at least a portion of the fresh cooking oil from the second fresh cooking oil tank into a first fryer; collecting used cooking oil from the fryer in a first used cooking oil tank associated with a second portable device; and transferring at least a portion of the used cooking oil from the first used cooking oil tank to a second used cooking oil tank.

The cooking oil distribution method may further comprise cooking food products with the fresh cooking oil.

The cooking oil distribution method may further comprise transferring at least a portion of the fresh cooking oil from the second fresh cooking oil tank into a second fryer. If so, the first fryer and the second fryer may be located in separate kitchens. The separate kitchens may be on separate floors.

In the cooking oil distribution method, the first portable device and the second portable device may be the same device. The device may include two pumps. The two pumps may be connected to distribution lines that converge in parallel in a single hand held distribution nozzle.

In a further embodiment of the present invention, a bulk cooking oil distribution system comprises a first fresh cooking oil tank; a second fresh cooking oil tank and a first used cooking oil tank associated with a portable device; and a second used cooking oil tank.

The bulk cooking oil distribution system may further comprise a first pump and associated fresh oil piping for delivering fresh cooking oil from the first fresh cooking oil tank to the second fresh cooking oil tank and a second pump and associated used oil piping for delivering used cooking oil from the first used cooking oil tank to the second used cooking oil tank. The fresh oil piping and the used oil piping may be separate piping systems.

In the bulk cooking oil distribution system, the portable device may comprise a propulsion mechanism.

In the bulk cooking oil distribution system, the first fresh cooking oil tank and the second used cooking oil tank may be located adjacent to each other.

In the bulk cooking oil distribution system, the second fresh cooking oil tank is may be larger than the first used cooking oil tank.

In a still further embodiment of the present invention, there is provided a portable device for transferring cooking oil. The portable device comprises a first three-way valve, a first pump, a nozzle, and a fresh oil tank, with piping interconnecting the three-way valve to the pump, the pump to the nozzle, and the fresh oil tank to the three-way valve. An outlet tube of the nozzle may direct flow from the nozzle to the fresh oil tank or a fryer. The portable device also includes a second three-way valve, a second pump, and a used oil tank, with piping interconnecting the nozzle to the pump, the pump to the three-way valve, and the three-way valve to the used oil tank. An inlet tube of the nozzle may be submerged into the fryer or connected to the used oil tank. This used oil path, from the inlet tube to the used oil tank, is preferably completely separate from the fresh oil path. Particularly, within the nozzle the two lines are generally parallel but do not interconnect.

In a cart service mode, the components may be utilized to direct flow of fresh oil from a bulk tank, to the first three-way valve via additional piping, then to the first pump, the nozzle, and finally to the fresh oil tank. The components may also be utilized in the cart service mode to direct flow of oil from the used oil tank to the nozzle, then to the pump and the second three-way valve, and finally through additional piping to a bulk used oil tank.

In a fryer service mode, the components may be utilized to direct, fresh oil from the fresh oil tank to the first three-way valve, the first pump, the nozzle, and through the outlet tube of the nozzle to a fryer. The components may also be utilized to collect used oil from the fryer by transferring it from the fryer into the inlet tube of the nozzle, then through the nozzle itself to the pump, and then to the three-way valve and finally the used oil tank.

In an additional embodiment of the present invention, a cooking oil distribution device comprises a fresh oil tank, a three-way valve connected by piping to the fresh oil tank, a pump connected by piping to the three-way valve, and a nozzle connected by piping to the pump, the nozzle comprising an outlet tube connected to the piping between the pump and the nozzle, where the cooking oil distribution device is portable.

In such a device, cooking oil may be transferred from a bulk tank to the fresh oil tank by connecting piping from the bulk tank to the three-way valve, arranging the three-way valve to connect the piping from the bulk tank to the piping connected to the pump, arranging the outlet tube in fluid communication with the fresh oil tank, and energizing the pump, whereby cooking oil flows from the bulk tank, through the three-way valve, through the pump, through the nozzle, and through the outlet tube, into the fresh oil tank.

In such a device, cooking oil may be transferred from, the fresh oil tank to a fryer by placing the outlet tube over the fryer, arranging the three-way valve to connect the piping from the fresh oil tank to the piping to the pump, and energizing the pump, whereby cooking oil flows from the fresh oil tank through the three-way valve, through the pump, through the nozzle, and through the outlet tube, into the fryer.

Such a device may further comprise a used oil tank, a second three-way valve connected by piping to the used oil tank, a second pump connected by piping to the three-way valve, and piping connecting the second pump to the nozzle, the nozzle further comprising an inlet tube connected to the piping between the pump and the nozzle.

In this modified device, used cooking oil may be transferred from a fryer by dipping the inlet tube into the used oil, arranging the second three-way valve to connect the piping from the second pump to the used oil tank, and energizing the second pump, whereby used cooking oil flows from the fryer through the inlet tube and the nozzle, through the pump and the three-way valve, and into the used oil tank.

In this modified device, used cooking oil may be transferred from the used oil tank to a bulk tank by placing the inlet tube in fluid communication with the used oil tank, arranging the three-way valve to connect the piping from the used oil tank to piping connected to the bulk tank, and energizing the second pump, whereby used cooking oil flows from the used oil tank, through the inlet tube and the nozzle, through the pump and the three-way valve, and into the bulk tank.

This modified device may further comprise a platform and wheels. It may also further comprise a propulsion mechanism to propel at least one of the wheels.

In this modified device, the fresh oil tank and the used oil tank may be approximately 40 gallons each.

In this modified device, the fresh oil tank and the used oil tank may be sized to service approximately five to six fryers.

This modified device may be sized to be moved through a standard service hallway. The hallway may be in one of a stadium, arena, cruise ship, casino, shopping mall, convention hall, or multi-story building.

In the modified device, the piping may be configured such that fresh cooking oil does not mix with used cooking oil.

In a still further embodiment of the invention, a portable cooking oil distribution device comprises a fresh oil tank and a used oil tank with four modes of operation. A first mode of operation permits transfer of fresh cooking oil from a bulk tank to the fresh oil tank, a second mode of operation permits transfer of fresh cooking oil from the fresh oil tank to a fryer, a third mode of operation permits transfer of used cooking oil from a fryer to the used oil tank, and a fourth mode of operation permits transfer of used cooking oil from the used oil tank to a second bulk tank.

The portable cooking oil distribution device may further comprise a propulsion mechanism. The propulsion mechanism may be powered by one of electric, propane, or gasoline.

The portable cooking oil distribution device may further comprise a first pump associated with the first and second modes of operation and a second pump associated with the third and fourth modes of operation. In one embodiment, fresh oil in the first and second modes of operation does not mix with used oil in the third and fourth modes of operation.

In an additional embodiment of the invention, a portable cooking oil distribution device comprises a fresh oil tank, a used oil tank, and additional components adapted to collect used cooking oil from a fryer and to fill the fryer with fresh cooking oil.

Such a device may be sized to fit within a standard service hallway of a stadium, arena, cruise ship, casino, shopping mall, convention hall, or multi-story building.

BRIEF DESCRIPTION OF THE DRAWINGS

The subject matter regarded as the invention is particularly pointed out and distinctly claimed in the concluding portion of the specification. The invention, however, both as to organization and method of operation, together with features, objects, and advantages thereof, will be or become apparent to one with skill in the art upon reference to the following detailed description when read with the accompanying drawings. It is intended that any additional organizations, methods of operation, features, objects or advantages ascertained by one skilled in the art be included within this description, be within the scope of the present invention, and be protected by the accompanying claims.

With respect to the drawings.

FIG. 6A depicts an oil flow schematic of the fresh oil flow path in an exemplary cart while in the cart service mode;

FIG. 6B depicts an oil flow schematic of the fresh oil flow path in an exemplary cart while in the fryer service mode;

FIG. 7A depicts an oil flow schematic of the used oil flow path in an exemplary cart while in a cart service mode; and, FIG. 7B depicts an on flow schematic of used oil flow path in an exemplary cart while in a fryer service mode.

DETAILED DESCRIPTION

Figure 1:
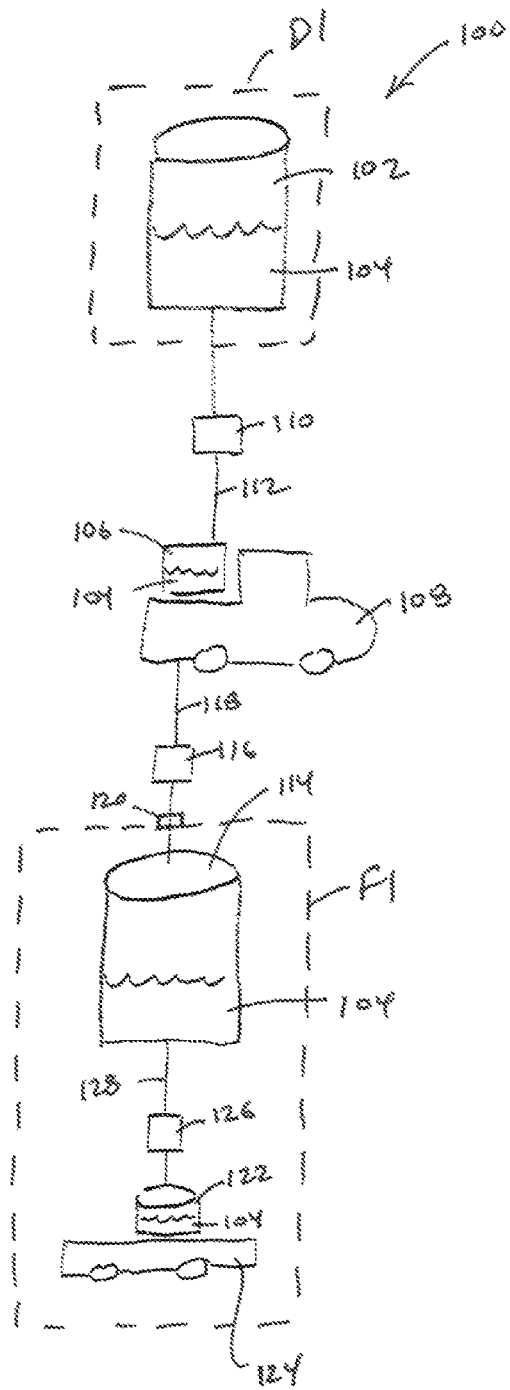
FIG. 1 is a schematic overview of a bulk cooking oil distribution system and associated methods in accordance with certain aspects of the invention.

In the following are described the preferred embodiments of the bulk cooking oil distribution system in accordance with the present invention. In describing the embodiments illustrated in the drawings, specific terminology will be used for the sake of clarity. However, the invention is not intended to be limited to the specific terms so selected, and it is to foe understood that each specific term includes all technical equivalents that operate in a similar manner to accomplish a similar purpose. Where like elements have been depicted in multiple embodiments, identical reference numerals have been used in the multiple embodiments for ease of understanding.

Throughout this disclosure reference is made to cooking oil stored in a tank and then transported to another tank. It is to be understood that when cooking oil is transferred, the same reference number may be utilized to represent a portion of that original cooking oil. For example, if the disclosure states that a first tank contains cooking oil and then states that cooking oil is transferred from the first tank to a second tank, it is to be understood that this includes less than the full amount of cooking oil, even if the same reference numeral is provided. Indeed, typically less than the entire amount of cooking oil may be transferred from tank to tank, particularly in relation to the fresh cooking oil supply. Another way to view this scenario is by considering the cooking oil to be a very small quantity, such that the entire "small quantity" of cooking oil from one tank is indeed transferred to the next tank.

It is also noted that various components may be described as connected, fluidly connected, or in fluid communication in relation to a flow path of oil. Where such terminology is used, it is to be understood in accordance with its broadest reasonable interpretation to include direct physical connections between the two components, or connections through additional intervening components, so long as fluid may flow in the manner prescribed. Moreover, actual connection may not be necessary. For example, in relation to fresh oil flow from the outlet tube of the nozzle to a fryer, the fresh oil flow may merely be directed through the air above the fryer into the fryer while still being connected. Likewise, connection of the inlet tube of the nozzle may be achieved by dipping the inlet tube into used oil. Where is discussed that piping is connected to the nozzle, it is to be understood that the piping may merely be contained within the nozzle and in actuality is fluidly connected with either the inlet tube or outlet tube.

With reference to FIG. 1, there is provided a schematic view of a bulk cooking oil distribution system 100 and associated methods in accordance with certain aspects of the invention. In accordance with this first embodiment, only the supply side 100 is shown. In this supply side embodiment 100, a first fresh cooking oil tank 102 is provided at an oil distribution depot D1. Typically, this first fresh cooking oil tank 102 will be of a capacity of between 1,000 and 5,000 gallons, but may be more or less depending on the needs of the distributor. Such tanks are commonly provided in metals such as stainless steel or aluminum, or plastics such as polypropylene, and should be FDA and HACCP approved. Of course, other materials may be used.

Within the first fresh cooking oil tank 102 is a supply of fresh cooking oil 104. This supply is commonly provided by a bulk cooking oil manufacturer and is brought to the distribution depot D1 via a supply vehicle (not shown). From the supply vehicle the fresh cooking oil 104 is conveyed into tank 102 via a transfer pump and associated piping provided either in conjunction with the supply vehicle or the depot D1.

When it becomes desirous to transport fresh cooking oil 104 from the depot DI to a facility that uses cooking oil F1, fresh cooking oil may be transferred to a second fresh cooking oil tank 106 which is associated with a vehicle 108. Depending on the oil shipment size required, this association may be a separate tank located in the rear of a pickup truck or box truck, or may be a completely integrated tank in a tanker truck. Typically, this second fresh cooking oil tank will have a capacity of between 100 and 3,000 gallons and will be either metal or plastic if a separate tank in a pickup truck or box truck, or metal if integrated into a tanker truck. The tank 106 should also be FDA and HACCP approved.

In order to convey the fresh cooking oil 104 from the first fresh cooking oil tank 102 to the second fresh cooking oil tank 106, a transfer pump 110 and piping 112 are employed. There are various methods for handling this operation that are well known to the skilled artisan. For present purposes, it is to be understood that the transfer pump 110 may be integrated into the vehicle or may be a fixture in the depot D1. If a fixture, transfer pump 110 and piping 112 may be the same transfer pump and piping used to transfer fresh oil from the supply vehicle to the first fresh cooking oil tank 102.

Vehicle 108 is then utilized to transport the fresh cooking oil 104 to a third fresh cooking oil tank 114 located at a facility that uses cooking oil F1. Although any facility that uses cooking oil may utilize the invention herein, the facilities where this type of system are primarily useful typically include, but are not limited to, restaurants, grocery stores, stadiums and arenas, shopping malls, convention centers, commercial buildings, sailing vessels such as cruise ships, and the like. In general, the most appropriate facilities for this technology are those where conventional forms of cooking oil distribution are impractical because of the distance between any kitchen and an exterior wall (whether a horizontal distance or vertical distance) or because the facility utilizes a number of kitchens where each requires cooking oil and where each may be remote from each other.

Upon arrival of the vehicle 108 at the facility F1, fresh cooking oil 104 is conveyed to third fresh cooking oil tank 114. This conveyance is typically achieved by utilizing a transfer pump 116 and associated piping 118. Commonly, this transfer pump 116 and piping 118 forms a portion of vehicle, and therefore travels with vehicle. However, that need not be true and the transfer pump 116 and/or piping 118 may remain at the facility F1. As is commonly known in the industry for delivery of fresh cooking oil, an outer wall of facility F1 may include a junction box 120 for placing second fresh cooking oil tank 106 in fluid communication with third fresh cooking oil tank 114. In such case, the piping upstream of the junction box 120 will be associated with the vehicle 108 and the piping downstream of the junction box will be associated with the facility F1.

It will be appreciated that third fresh oil tank 114 is preferably located at the facility F1 in reasonable proximity to an exterior wall. In this manner, the run of piping need not excessively interfere with the aesthetics of the facility F1 nor be too costly to install. Moreover, by maintaining a reasonable run of piping, transfer pump 116 may be kept to a minimal power rating, also serving to keep costs of the system lower.

The capacity of fresh cooking oil tank 114 will depend generally on the needs of the facility F1 for which it is used. For example, a cruise ship that may not be able to refill for weeks at sea may require a large tank on the order of 3,000 gallons while a shopping mall, that many have various kitchens in a food court but which can be refilled more often, may only require 1,000 gallons. Facilities such as restaurants that have even fewer number of kitchens, or one remote kitchen, may only require 100 gallons. Typically, however, this second fresh cooking oil tank 114 will have a capacity of between 100 and 3,000 gallons and will be either metal or plastic and should be FDA and HACCP approved.

Once the fresh oil 104 is transferred to the third fresh cooking oil tank 114 in facility F1, it is available for use by facility F1 personnel as instructed. Primarily, this manner will be for use in fryers in one or more kitchens. To transfer the fresh cooking oil 104 to the fryers, the fresh cooking oil is transferred to a fourth fresh cooking oil tank 122, where the fourth fresh cooking oil tank is associated with a first portable device 124.

Preferably, the fourth fresh cooking oil tank 122 of the first portable device 124 has a capacity of approximately 40 gallons. This size strikes a balance between portability and useful capacity as 40 gallons of fresh oil can be pushed by hand but is still enough to fill 5-6 standard sized fryers.

Obviously, the fourth fresh cooking oil tank 122 may have other capacities, for example 10 gallons to 50 gallons, or more.

The fourth fresh cooking oil tank 122 may be configured from plastic or metal and should be FDA and HACCP approved.

Additional details of exemplary portable devices 124 will be provided below, however it should be noted that the portable device preferably includes a transfer pump 126 and associated piping 128. It is through this transfer pump 126 and associated piping 128 that fresh cooking oil 104 is conveyed from the third fresh cooking oil tank 114 to the fourth fresh cooking oil tank 122. In other embodiments, a pump 126 that is not associated with the portable device 124 may be utilized. In other embodiments, the fourth fresh oil tank 114 may have the ability to open at the top (or may be open at the top) while the third fresh oil tank 114 is provided with a drain valve (not shown), whereby the fourth fresh cooking oil tank 122 may be positioned below the drain valve with the top of the fourth fresh cooking oil tank opened to drain fresh cooking oil directly into the fourth fresh cooking oil tank.

Once the fourth fresh cooking oil tank 122 is filled, or partially filled, with fresh cooking oil 104, portable device 124 can be moved from the location of the fourth fresh cooking oil tank to one or more remote kitchens. At each of the kitchens, fresh cooking oil 104 is be transferred from the fourth fresh cooking oil tank 122 to one or more fryers located in the respective kitchen. As will be discussed below, this transfer is preferably conducted via a transfer pump and piping, but may utilize other means as well.

It is noted that the portable device 124 may be a simple platform 125 with wheels 127 that is pushed manually. More intricate devices may power the cart with a propulsion mechanism 129, such as those powered by electric, propane, or gasoline. In this case, the portable device 124 may be akin to a golf cart-type device or a powered platform truck. In any event, the portable device 124 is preferably small enough that it can fit within the confines of a facility, including accessing remote kitchen areas.

Once the fresh cooking oil 104 is transferred to one or more fryers it may be used in the ordinary course by the kitchen staff whereby it is converted into used cooking oil.

Figure 2:
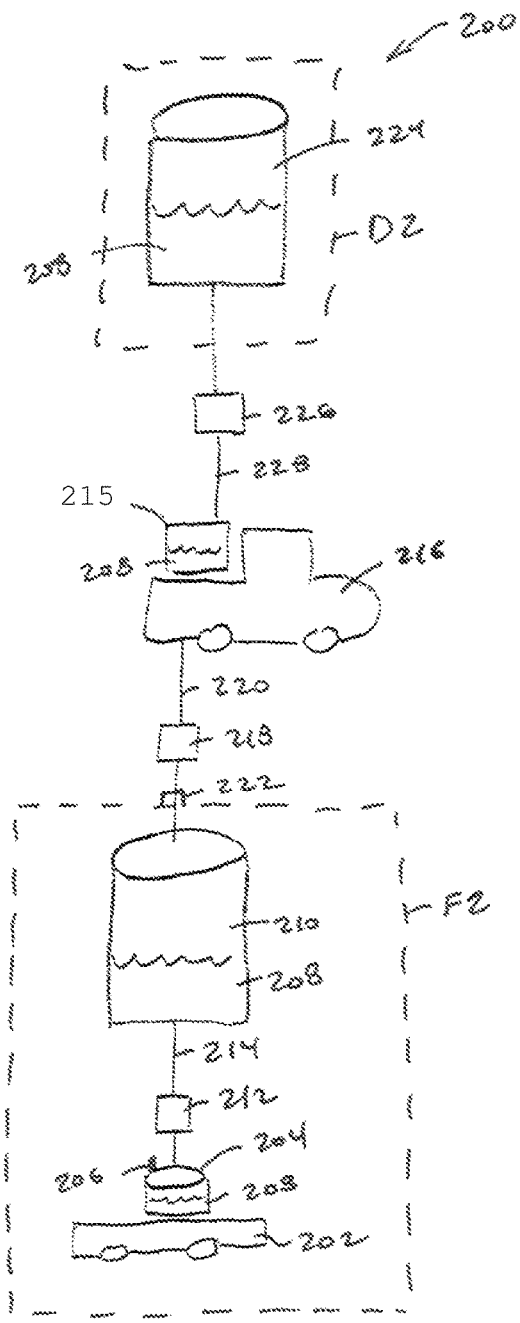
FIG. 2 is a schematic overview of a further embodiment of the bulk cooking oil distribution system of the present invention.
Figure 3:
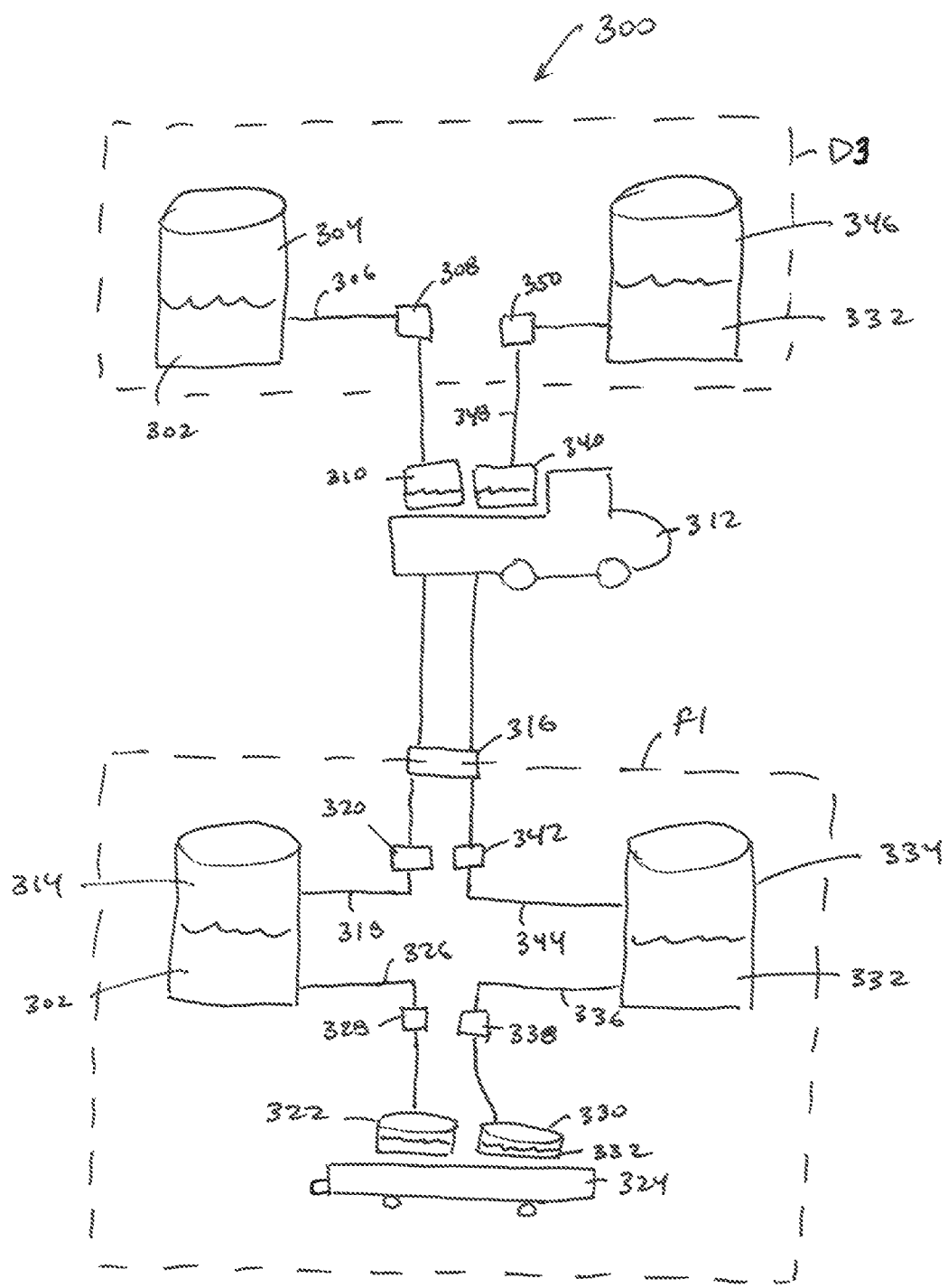
FIG. 3 is a schematic overview of a still further embodiment of the bulk cooking oil distribution system of the present invention.

In accordance with certain embodiments of the present invention, including those provided in FIG. 2, a bulk cooking oil distribution system 200 comprises apparatuses for the collection of used cooking oil. It should be noted that in a preferred embodiment, the apparatuses shown in FIG. 1 and FIG. 2 are included in the same bulk cooking oil distribution system, as shown in FIG. 3.

As shown in FIG. 2, a second portable device 202 may be provided with a first used cooking oil tank 204. Like the first portable device 124, the second portable device 202 may be a simple platform with wheels that is pushed manually. More intricate devices may power the cart with a propulsion mechanism, such as those powered by electric, propane, or gasoline. In this case, the portable device 202 may akin to a golf cart-type device or a powered platform truck. In any event, the portable device 102 is preferably small enough that it can fit within the confines of the facility, including accessing remote kitchen areas. In some embodiments of the invention, the first and second portable devices 124, 202 may be the same portable device configured with two separate tanks, a fresh cooking oil tank and a used cooking oil tank. Such a portable device is shown in FIG. 3.

Preferably, the first used cooking oil tank 204 of the second portable device 202 has a capacity of approximately 40 gallons. This size strikes a balance between portability and useful capacity as 40 gallons of used oil can be pushed by hand but is still enough to collect used cooking oil from 5-6 standard sized fryers. Of course, the first used cooking oil tank 204 may have other capacities, for example 10 gallons to 50 gallons, or more.

In the case where the fourth fresh cooking oil tank 122 and the first used cooking oil tank 204 are associated with the same portable device, it is preferred that the fourth fresh cooking oil tank and the first used cooking oil tank have approximately the same volume, or at least be sized for servicing the same number of fryers. If there is any discrepancy in the volume, it is preferred that the fourth fresh cooking oil tank 122 be of a slightly larger capacity, approximately 5-20%, to account for cooking oil loss during the cooking process. In this regard, it is well known that some of the cooking oil used in cooking remains with the cooked food such that used cooking oil volume is less than the fresh cooking oil volume placed in any fryer.

The first used cooking oil tank 204 may be provided in metals such as stainless steel or aluminum, or plastics such as polypropylene, and should be FDA and HACCP approved. Of course, other materials may be used. To account for potential filling with used cooking oil at an elevated temperature, it is preferred that the first used cooking oil tank 204 be made of metal and possibly be insulated to protect other components of the second portable device 202 and the second portable device itself. It is also preferred that the first used cooking oil tank 204 be provided with a vent 206 to permit air exchange with the atmosphere to prevent excessive pressure build up.

Used cooking oil 208 from the various fryers in the facility F2 may be collected in the first used cooking oil tank 204 by being spilled directly into the first used cooking oil tank via a drain spout in the fryer or collected using a hand held distribution nozzle that may be associated with the second portable device.

Once the used cooking oil 208 from the facility F2 is collected in the first used cooking oil tank 204, the first portable device 202 may be moved to a second used cooking oil tank 210. If the facility F2 includes a fresh oil supply system 100, such that F1 is F2, then the second used cooking oil tank 210 is preferably located at the facility F2 adjacent the third fresh cooking oil tank 114. The used cooking oil 208 may then be transferred from the first used cooking oil tank 204 to the second used cooking oil tank 210 via a transfer pump 212 and associated piping 214. The transfer pump 212 and associated piping 214 may be integrated into the portable device 202 or may be separate.

The second used cooking oil tank 210 is typically of a capacity of between 1,000 and 3,000 gallons, but may be more or less depending on the needs of the facility. Commonly, the second used oil tank 210 will be sized approximately equal to, or slightly less than, the size of the third fresh cooking oil tank 114, it so provided. Such tanks are commonly provided in metals such as stainless steel or aluminum, or plastics such as polypropylene, and should be FDA and HACCP approved. Of course, other materials may be used. Because the used oil 208 will typically cool before being transferred to the second used oil tank 210, one typically does not have to account for elevated oil temperatures in the tank.

The used cooking oil collected in the second used cooking oil tank 210 may be transferred to a third used cooking oil tank 215 associated, with a vehicle 216. The vehicle 216 may have the third used cooking oil tank 215 integrated therein, for example in a tanker truck, or may have a separate tank mounted to the vehicle, for example the rear of a pickup truck or box truck. Typically, this third used cooking oil tank will have a capacity of between 100 and 3,000 gallons and will be either metal or plastic if a separate tank in a pickup truck or box truck, or metal if integrated into a tanker truck.

To convey used cooking oil from the second used cooking oil tank 210 to the third used cooking oil tank 215, a pump 218 and associated piping 220 is utilized. The pump 218 and piping 220 may be associated with the vehicle 216 or may remain in the facility F2. Preferably, piping that terminates in a junction box 222 located on an exterior wall of the facility F2 is provided. A vehicle may then attach piping to the junction box 222 to draw the used cooking oil 208 from the second used cooking oil tank 210, either with a pump associated with the vehicle or a pump associated with the facility.

Used cook oil 208 contained in the third used cooking oil tank 214 may be brought by the vehicle 216 directly to a used cooking oil renderer, or preferably to a depot D2. In a most preferred system, depot D1 and depot D2 are the same depot. Located at depot D2 is a fourth used cooking oil tank 224. This fourth used cooking oil tank 224 is typically of a capacity of between 1,000 and 5,000 gallons, but may be more or less depending on the needs of the distributor. Such tanks are commonly provided in metals such as stainless steel or aluminum, or plastics such as polypropylene, and should be FDA and HACCP approved. Of course, other materials may be used. Once collected the fourth used cooking oil tank 224, the used cooking oil 208 may be rendered on site for other use or may be transferred to an off-site renderer.

In order to convey the used cooking oil 208 to the fourth used cooking oil tank 224 from the third used cooking oil tank 214, a pump 226 and piping 228 are used. The pump 226 and piping 228 may form part of the vehicle 216 or may be part of the depot D2. Where depot D1 and depot D2 are the same depot, pump 226 and pump 110 may be the same pump.

Typically most of the activities of the bulk cooking oil system will be conducted by a single entity, or at the instruction of a single entity. For example, the oil distribution entity will either own or lease the depot D1. Its personnel will be responsible for receiving fresh cooking oil in the first fresh cooking oil tank and thereafter be responsible for conveyance of the fresh cooking oil all the way to the third fresh cooking oil tank at facility F1. Conveyance of the fresh cooking oil into the fourth fresh cooking oil tank and any fryer will then be at the instruction of the entity and typically conducted by facility F1 personnel. Likewise, collection of used cooking oil and conveyance to the second used cooking oil tank will typically be at the instruction of the entity and conducted by facility F2 personnel. Finally, entity personnel will typically be directly responsible for conveyance of the used cooking oil from the second used cooking oil tank to the fourth used cooking oil tank. It is noted that use of the term instruction is not to be limited to mere instruction but may also include direction and control.

FIG. 3 depicts a typical bulk cooking oil distribution system 300, which includes both supply and recovery of cooking oil. It will be appreciated that the majority of the operations of the bulk cooking oil distribution system 300 operate in much the same manner as the two systems 100, 200 previously discussed. However, the system 300 will be briefly discussed below.

Once again, fresh cooking oil 302 is delivered to a first fresh cooking oil tank 304 at a depot D3, From there it is conveyed through piping 306 and a pump 308 to a second fresh cooking oil tank 310 forming part of a vehicle 312. The vehicle 312 then brings the fresh cooking oil 302 to the facility F1 that is desirous of the fresh oil, and conveys that oil to a third fresh cooking oil tank 314. The conveyance is through a junction box 316 on the outer wail of the facility F1 and incorporates piping 318 and a pump 320. From there, the fresh oil 302 is moved to a fourth fresh cooking oil tank 322 mounted on a cart 324. That conveyance is through piping 326 and a pump 328.

The cart 324 may then be brought to the locations of fryers within the facility F1 to transfer the fresh cooking oil to the fryers. In this embodiment, the cart 324 also includes a used cooking oil tank 330 that can collect used cooking oil 332. That used cooking oil 332 can then be brought to a second used cooking oil tank 334 located in the facility, preferably near an external wall, and preferably adjacent to the third fresh cooking oil tank 314. Conveyance of used cooking oil 332 to the second used cooking oil tank is achieved via piping 336 and a pump 338.

Vehicle 312 may then be utilized to collect the used cooking oil 332 in a third used cooking oil tank 340 associated with the vehicle. The used cooking oil 332 is conveyed to the vehicle 312 through the junction box 316 and a pump 342 with associated piping 344. Preferably, the vehicle 312 will pick up used cooking oil 332 during the same trip that it delivers fresh cooking oil 302.

Once loaded with used cooking oil 332, the vehicle will return to the depot D3 for delivery of the used cooking oil to a fourth used cooking oil tank 346. This delivery is made through piping 348 and a pump 350.

Figure 4:
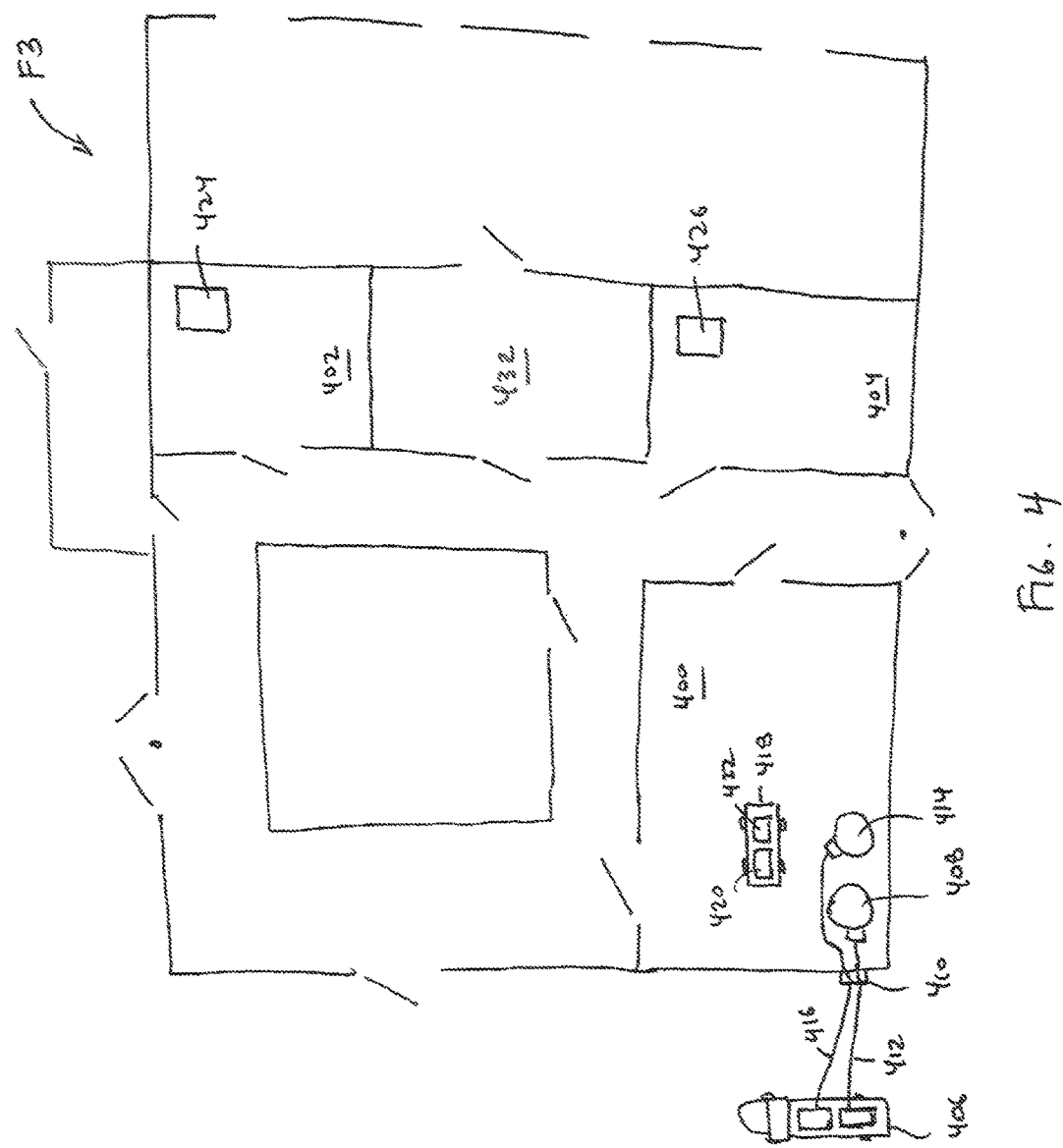
FIG. 4 is a first floor plan of a typical facility in which embodiments of the present invention may be utilized.

FIG. 4 depicts a first floor plan of an exemplary facility F3 that may use cooking oil. The facility F3 includes a number of rooms and connecting service hallways, including a storage room 400 and kitchens 402, 404. It will be appreciated that although the kitchens 402, 404 are located on external walls, they are remote from each other and therefore piping cooking oil using conventional methods is not practical.

Instead, the facility F3 is supplied with cooking oil using systems and methods of the present invention. Here, a vehicle 406 delivers fresh cooking oil (not shown) to the facility F3 and conveys that oil to a first fresh cooking oil tank 408 through a junction box 410 and piping 412. It is noted here that the vehicle 406 may also collect used cooking oil from a second used cooking oil tank 414 through the junction box 410 and piping 416.

Once the fresh cooking oil is supplied to the first fresh cooking oil tank 408, the oil is available for use by the facility. To convey the oil to the remote kitchens 402, 404, a portable cart 418 is utilized. The portable cart includes a second fresh cooking oil tank 420 for this purpose as well as a first used, cooking oil tank 422 for collection of used, cooking oil.

It will be appreciated that oil is conveyed from the first fresh cooking oil tank 408 to the second fresh cooking oil tank 420 of the cart by various means previously discussed. The cart 418 may then be pushed or driven to the remote kitchens 402, 404 to fill fryers 424, 426 located in the kitchens. During the same trip that one fryers 424, 426 are filled, used cooking oil from the fryers can be deposited into the first used cooking oil tank 422 of the cart. The cart can then be returned back to the supply room 400 where the used oil is conveyed to the second used cooking oil tank 414 for later pickup.

Figure 5:
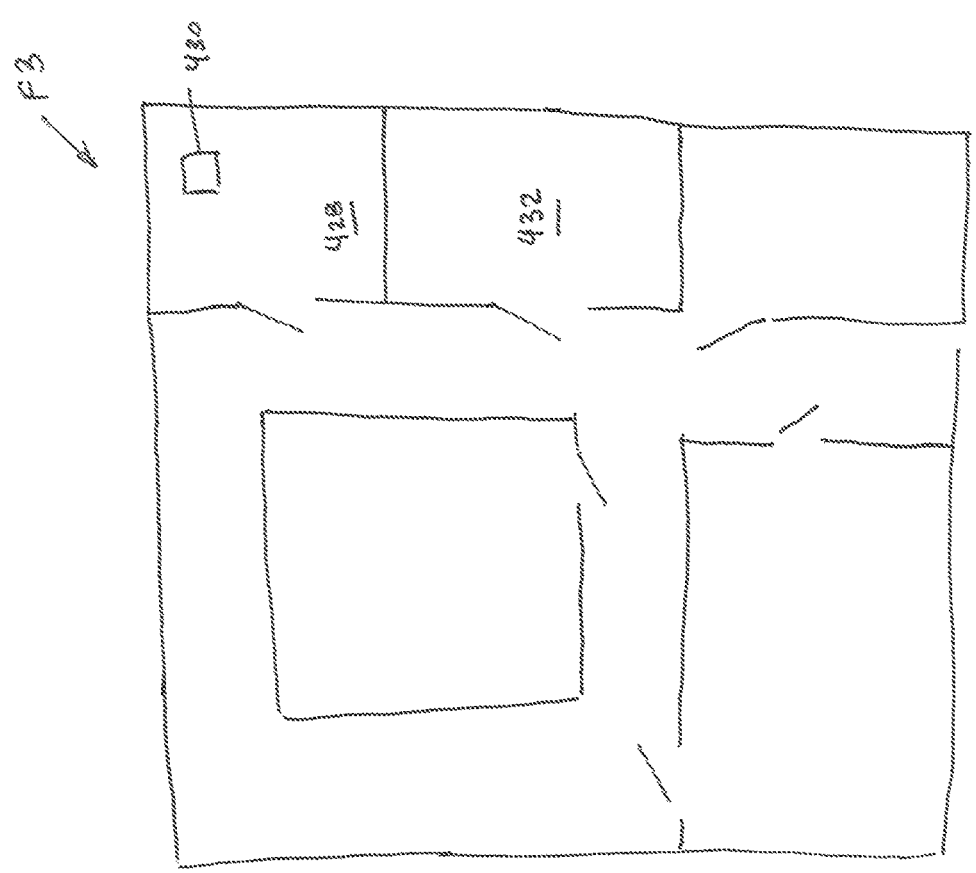
FIG. 5 is a second floor plan of the facility of FIG. 4.

It will also be appreciated that there may be more than two kitchens provided in any facility, and those kitchens may also be on separate floors. For example, FIG. 5 depicts a second floor plan of the facility F3 of FIG. 4. In FIG. 5, there is shown a third kitchen 428 with a third fryer 430 located on this second floor. In order to service this third kitchen 428 and fryer 430 with oil from storage room 400, there is provided an elevator 432. The cart 418 may therefore travel in the elevator between the first and second floors of facility F3 to service all of the kitchens.

Preferably, the cart 418 is sized to easily maneuver through the facility F3, including standard sized service hallways and doorways, and is relatively compact. This compact configuration is partially derived through the use of minimal components in a novel manner. Some of the components can be those shown and described in U.S. Pat. No. 6,792,983, including the nozzle.

The cart generally includes two modes of operation. In a cart service mode, fresh cooking oil may be delivered from a bulk tank to a fresh oil tank associated with the cart. In the meantime, used cooking oil may be removed from the used oil tank on the cart and transferred to a bulk used cooking oil tank. Both of these activities will typically be conducted in the direct vicinity of the bulk tanks.

In a fryer service mode, typically entered into at the kitchen sites, the cart is used to service fryers. Here, fresh cooking oil from the fresh cooking oil tank associated with the cart may be pumped to a fryer. Additionally, used cooking oil may be removed from the fryer and pumped into the used cooking oil tank associated with the cart. In both cases, the nozzle of U.S. Pat. No. 6,792,383 may be utilized.

FIG. 6A depicts an oil flow schematic of the fresh oil flow path in an exemplary cart while in the cart service mode. Shown in FIG. 6A is a bulk tank 500 for the storage of fresh cooking oil. Also shown are a three-way valve 502 with quick disconnect 504, pump 506, nozzle 508, and fresh oil tank 510, all of which are associated with the cart 512. Also shown is a fryer 514 located in a kitchen.

In order to transfer fresh cooking oil from the bulk tank 500 to the fresh oil tank 510, piping 516, preferably in the form of a flexible hose, is connected from the bulk tank to the quick disconnect 504 of the cart 512. For purposes of this connection it is preferred that the piping 516 and the quick disconnect 504 have characteristics that are specific to that connection, such as size and configuration, so that the piping is not accidently connected to the quick disconnect associated with the used oil, as will be discussed below. In this mode of operation the three-way valve 502 is set up, either manually or electronically, to connect piping 516 to piping 518 configured between the three-way valve and the pump 506. The pump 506 is in turn connected by piping 520 to the nozzle 508. Piping 520 in turn is connected to the outlet tube 522 of the nozzle 508. Preferably this piping is hard piped and somewhat permanently connected. In this mode of operation, the outlet tube 522 is placed within a port 524, or opening, within the cart 512 that leads to the fresh oil tank 510.

Therefore, when it is desired to fill the fresh oil tank 510 with fresh cooking oil, an operator may plug piping 516 into the quick disconnect 504 and the outlet tube 522 of the nozzle 508 into the port 524. The operator then ensures that the three-way valve 502 is properly oriented and energizes the pump 506 using controls 526 on the nozzle 508. It will be appreciated that the pumps described herein may be powered by battery or A/C current.

It will be appreciated that various means for ensuring that the fresh oil tank 510 does not overflow may be incorporated. Such means may include a visual level meter, electronic shutoff, or flow timer. Additional means within the purview of one skilled in the art may also be utilized.

As previously discussed, piping 516 is preferably in the form of flexible hose. While piping 518 and 520 may also be formed from flexible hose, it is preferred that such piping be configured for relatively permanent connection and therefore may be hard piped, such as with metals. These metals may be stainless steel.

FIG. 6B depicts an oil flow schematic of the fresh oil flow path in an exemplary cart, while in the fryer service mode. Shown in FIG. 6B is the bulk tank 500 for the storage of fresh cooking oil. Also shown are the three-way valve 502 with quick disconnect 504, pump 506, nozzle 508, and fresh oil tank 510, all of which are associated with the cart. Likewise, the fryer 514 is shown in a kitchen.

In order to transfer fresh cooking oil from the fresh oil tank 510 of the cart 512, additional piping is provided. In this case, piping 518 and 520 remain in their respective positions between the three-way valve 502 and pump 506, and between the pump and nozzle 508, respectively. The outlet tube 522 of the nozzle 508 is not positioned within the port 524 of the cart 512 but rather is positioned above the fryer 514 to dispense oil therein. Furthermore, piping 528 is fixed between the fresh oil tank 510 and the three-way valve 502, as shown. Lastly, piping 516 (FIG. 6A) between the bulk tank 500 and quick disconnect 504 is no longer necessary as presumably the cart 512 would be moved to a kitchen while in the fryer service mode.

In this mode of operation the three-way valve 502 is set up, either manually or electronically, to connect piping 528 from the fresh oil tank 510 to piping 518 configured between the three-way valve and the pump 506. Therefore, the connection to the quick disconnect 504 is closed off. The pump 506 is in turn connected by piping 520 to the nozzle 508. Piping 520 is connected to the outlet tube 522 of the nozzle 508.

When it is desired to fill the fryer 514 with fresh cooking oil, an operator may place the outlet tube 522 of the nozzle 508 above the fryer. The operator then ensures that the three-way valve 502 is properly oriented and energizes the pump 506 using controls 526 on the nozzle 508. The pump 506 will then draw fresh oil from the fresh oil tank 510 through piping 528, three-way valve 502, and piping 518. The pump 506 will then push that fresh oil through piping 520, nozzle 508, and outlet tube 522 into the fryer 514.

FIG. 7A depicts an oil flow schematic of the used oil flow path in an exemplary cart while in a cart service mode. Note that the cart shown in FIG. 7A may be the same cart shown in FIG. 6A, or may be a separate cart. Preferably, it is the same cart.

Shown in FIG. 7A is a bulk tank 600 for the storage of used cooking oil. Also shown are a three-way valve 602 with quick disconnect 604, nozzle 608, and used oil tank 610, all of which are associated with the cart 612. Also shown is a fryer 614 located in a kitchen.

In order to transfer used cooking oil from the used oil tank 610 to the bulk tank 600 piping is provided. In the cart itself, this piping comprises piping 620 connecting the nozzle 608 to the pump 606 and piping 618 connecting the pump to the three-way valve 602. Preferably this piping is hard piped and somewhat permanently connected. In the meantime, inlet tube 622 of the nozzle 608 may be placed in a port 624 to connect the used oil tank 610 to the nozzle 608.

From the quick disconnect 604 of the three-way valve 602, additional, piping 616 connects to the bulk tank 6001 This piping may be in the form of flexible hose. For purposes of the connection between the quick disconnect 604 and the bulk tank 600, it is preferred that the piping 616 and the quick disconnect 604 have characteristics that are specific to that connection, such as size and configuration, so that the piping is not accidently connected to the quick disconnect associated with the fresh oil. In one exemplary embodiment, the quick disconnect 504 on the fresh oil side is a male connection while the quick disconnect 604 on the used oil side is a female connection. Others configurations such as different sized connection diameters may also be utilized.

When it is desired to transfer used oil from the used oil tank 610 to the bulk tank 600, the operator will move the cart 612 to the location of the bulk tank 600. The operator will then insert the inlet tube 622 of the nozzle 608 into the port 624. This effectively connects the nozzle 608 to the used oil tank 610. The operator will then connect the quick disconnect 604 to piping 616 to connect the cart to the bulk tank 600. Lastly, the operator will ensure that the three-way valve is positioned properly such that oil flow will move from piping 618 to piping 616. These steps may also be conducted in different order. Lastly, however, the operator will energize the pump 606 using controls 626 and used oil will be drawn from the used oil tank 610, through the inlet tube 622, into nozzle 608, and then into the pump 606 through piping 620. From there, used oil will be forced through piping 618, into the three-way valve 602, piping 616, and finally into the bulk tank 600. When the used oil tank is emptied, or when the operator so desires, the flow may be stopped. The operator may then disconnect piping 616 and remove the inlet tube 622 from the port to safely move the cart throughout the facility.

FIG. 7B depicts an oil flow schematic of the used oil flow path in an exemplary cart while in a fryer service mode. Shown in FIG. 7B is the bulk tank 600 for the storage of used cooking oil. Also shown are the three-way valve 602 with quick disconnect 604, pump 606, nozzle 608, and used oil tank 610, all of which are associated with the cart 612. Likewise, the fryer 614 is shown in a kitchen.

In order to transfer used cooking oil from the fryer 614 to the used oil tank 610 of the cart 612, the inlet tube 622 of the nozzle 608 is placed within the used on of the fryer 614. The three-way valve 602 is also configured to permit flow from piping 618, through the three-way valve, and into piping 628 which is configured between the three-way valve and the used oil tank 610. When the pump 606 is energized via the control 626, used oil flows from the fryer 614, through the inlet tube 622, into the nozzle 608 and piping 620 to the pump 606, and then through piping 618, three-way valve 602, and piping 628, finally arriving at the used oil tank 610. When desired, the operator may de-energize the pump with the control 626.

It will be appreciated that the flow paths of the fresh oil piping and the used oil piping do not interconnect. Therefore, at no point does used oil compromise the integrity of the fresh oil.

Given the foregoing four modes of operation, fresh oil can be transferred into the cart at the location of a bulk tank. The cart may then be moved to one or more remote fryers where the fresh oil may be transferred to the fryers utilizing the nozzle. In the meantime, used oil from the one or more fryers maybe drawn from the fryers into the cart. The cart can then be moved to the location of a used bulk oil tank for transfer of the used oil into the bulk tank. Using these methods of operations, facilities that could not be supplied with bulk oil may now be.

It will also be appreciated that the cart may be configured with components that do not include the nozzle described, in U.S. Pat. No. 6,792,983. In such case, the cart may configured as shown in FIGS. 6A-7B, with the exception that instead of a single nozzle there may be two nozzles, one in the system of FIGS. 6A-6B and a second in the system of FIGS. 7A-7B. In this way, fresh and used oil would still not mix. Of course, there can also be other piping configurations through which fresh and used oil does mix, for example by utilizing a single pump.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

We claim:

1. A portable cooking oil distribution device comprising:
a first tank for storing cooking oil; and
at least one wheel powered by a propulsion mechanism;
wherein said portable cooking oil distribution device is sized to fit within a standard service hallway of a stadium, arena, cruise ship, casino, shopping mall, convention hall, or multi-story building in order to be moved between kitchens of such facilities in routine use; and
wherein said first tank has a capacity of at least 30 gallons.

2. The portable cooking oil distribution device of claim 1, further comprising a second tank for storing cooking oil, said second tank having a capacity of at least 30 gallons.

3. The portable cooking oil distribution device of claim 2, wherein said first tank is adapted for storage of fresh cooking oil and said second tank is adapted for storage of used cooking oil.

4. The portable cooking oil distribution device of claim 3, further comprising a first pump associated with said first tank.

5. The portable cooking oil distribution device of claim 4, further comprising a second pump associated with said second tank.

6. The portable cooking oil distribution device of claim 2, further comprising a first pump and piping leading away from said first tank and a second pump and piping leading to said second tank, said first pump and piping being isolated from said second pump and piping.

7. The portable cooking oil distribution device of claim 1, further comprising a pump and piping adapted to facilitate storage of cooking oil in said first tank.

8. A portable cooking oil distribution device comprising:
a fresh oil tank and a used oil tank;
wherein said cooking oil distribution device comprises four modes of operation, a first mode of which permits transfer of fresh cooking oil from a bulk tank to said fresh oil tank, a second mode of which permits transfer of fresh cooking oil from said fresh oil tank to a fryer, a third mode of which permits transfer of used cooking oil from a fryer to said used oil tank, and a fourth mode of which permits transfer of used cooking oil from said used oil tank to a second bulk tank;
wherein fresh oil in said first and second modes of operation does not mix with used oil in said third and fourth modes of operation;
said portable cooking oil distribution device further comprising wheels, at least one of which being powered by a propulsion mechanism;

said portable cooking oil distribution device being sized to fit within a standard service hallway of a stadium, arena, cruise ship, casino, shopping mall, convention hall, or multi-story building in order to be moved between kitchens of such facilities in routine use.

9. The portable cooking oil distribution device of claim 8, wherein said fresh oil tank and said used oil tank are greater than 30 gallons each.

10. The portable cooking oil distribution device of claim 8, wherein said fresh oil tank and said used oil tank have different capacities, said fresh oil tank being greater.

11. The portable cooking oil distribution device of claim 8, further comprising a first pump associated with the first and second modes of operation and a second pump associated with the third and fourth modes of operation.

12. A cooking oil distribution device system comprising:
a first portable device, said first portable device comprising a first oil tank with a capacity greater than 30 gallons;
a pump connected by piping to said first oil tank; and
a hand-held nozzle comprising an open tube connected by piping to said pump;
wherein said first portable device further comprises wheels to make said second portable device portable in routine use, at least one of said wheels being powered by a propulsion mechanism.

13. The cooking oil distribution system of claim 12, herein said open tube is an outlet tube and said first oil tank is a fresh oil tank.

14. The cooking oil distribution system of claim 13, further comprising a second portable device, said second portable device comprising a second oil tank with a capacity greater than 30 gallons;
a pump connected by piping to said second oil tank; and
a hand-held nozzle comprising an inlet tube connected by piping to said pump;
wherein said second portable device further comprises wheels to make said second portable device portable in routine use.

15. The cooking oil distribution system of claim 14, wherein said fresh oil tank and said used oil tank have different capacities, said fresh oil tank being greater.

16. The cooking oil distribution system of claim 12, wherein said first portable device is sized to be moved through a standard service hallway of a stadium, arena, cruise ship, casino, shopping mall, convention hall, or multi-story building.

* * * * *